United States Patent
Knickerbocker

[11] 3,923,014
[45] Dec. 2, 1975

[54] INTERNAL COMBUSTION ROTARY ENGINE

[76] Inventor: Karl Knickerbocker, 400 Baycrest Drive, Venice, Fla. 33595

[22] Filed: Apr. 24, 1974

[21] Appl. No.: 463,819

[52] U.S. Cl. .............. 123/8.49; 418/188; 418/191
[51] Int. Cl.² ....................................... F02B 53/06
[58] Field of Search .......... 418/191, 188; 123/8.49

[56] References Cited
UNITED STATES PATENTS

| 516,385 | 3/1894 | Weston | 418/191 X |
|---|---|---|---|
| 866,693 | 9/1907 | Southern | 418/191 X |
| 1,704,938 | 3/1929 | Gardes | 418/191 |

FOREIGN PATENTS OR APPLICATIONS

| 118,508 | 6/1930 | Austria | 123/8.49 |

*Primary Examiner*—C. J. Husar
*Assistant Examiner*—Leonard Smith
*Attorney, Agent, or Firm*—Rohe Meyer; Arthur W. Fisher, III

[57] ABSTRACT

This invention comprises a water cooled housing in which are mounted two rotors connected by spur gears to rotate in different directions on suitable shafts and which have their outside diameters of such configuration and embodying suitable seals to form a seal between portions of their outside diameters and the housing in which they rotate and with further configuration, namely, concavely curved with relation to the convex sealing surfaces of the rotors so that at a predetermined point during their rotation a sealed combustion or explosion chamber is formed between them. Combustible fuel under pressure is injected into this combustion chamber from a fuel inlet tube extending partially through the shaft of one of said rotors, which opening is normally closed but is automatically opened upon formation of the sealed combustion chamber between the two rotors. Immediately following injection of compressed fuel into the combustion chamber the fuel is ignited by a spark plug energization of which is created through an ignition distributor operated at the proper sequence of operation by rotation of the rotors. The fuel inlet openings are closed at the time of rotation. The explosive power acts upon the rotors to provide the power source and such power is taken off from the shaft of one of the rotors which projects through a suitable seal outside the housing. The fuel is delivered from a fuel mixer to a compressor, preferably of centrifugal or rotary type which delivers the compressed fuel to a suitable manifold from which it passes through the delivery tube and its outlet into the explosion chamber. The continued rotation of the rotors after explosion opens a suitable exhaust allowing clearance of exhaust fuel from between the rotors. Thus each rotation of the rotors provides a power stroke to the rotor and its shaft from which the power is taken to its point of use.

5 Claims, 4 Drawing Figures

INTERNAL COMBUSTION ROTARY ENGINE

An object of the invention is to provide a rotary engine of a four phase type wherein power is generated upon each rotation of the rotors providing substantially continuous power operation of the rotors wherein the admission explosion and exhaust of the fuel utilized to generate the power is provided upon each rotation of the rotors.

Another object of the invention is to provide a novel construction for injecting fuel under compression into a combustion chamber which is formed between the two rotors by the configuration of their outside diameters and which fuel injector system comprises a fuel inlet tube extending centrally through the shaft of one of the rotors and which has one or more openings which are adapted to open out into the combustion chamber but are normally closed until opened at the proper point upon formation of the explosive chamber by the outside diameter of the rotor other than the one which is supported by the shaft into which the injection tube extends and in which the configuration of the outside diameter of the two rotors are so shaped as to effectively seal off the combustion chamber between them during the injection of the fuel into the combustion chamber and its ignition by the spark plug and to open out the combustion chamber to suitable exhaust passage for the burned fuel during the continued rotation of the rotors.

The principle operation and function of the various components of the related rotary motor can be best understood by referring to the detailed description, taken in conjunction with the accompanying drawings in which.

Figure 1:
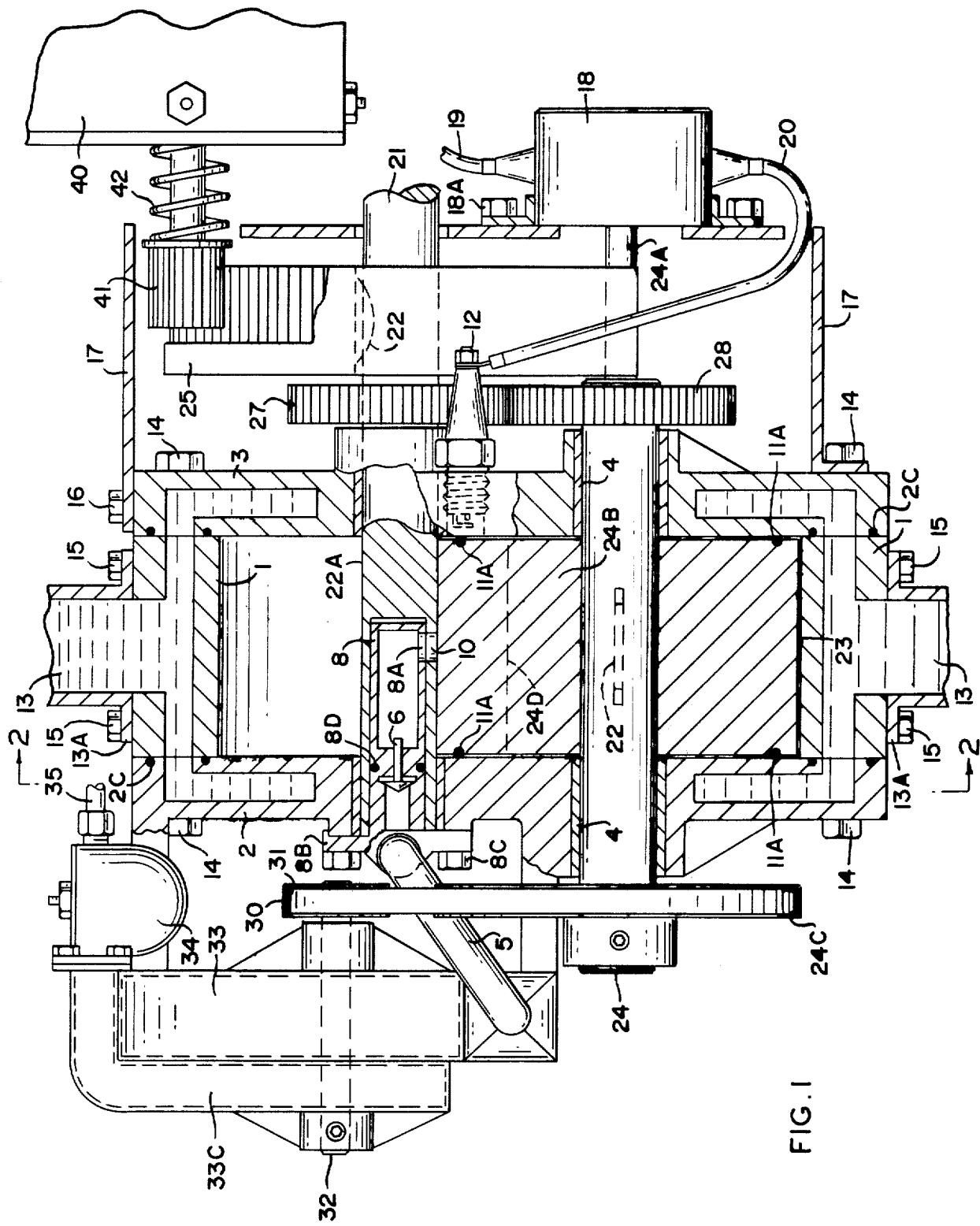
FIG. 1 is a schematic cross section of the rotary engine or motor construction taken on the line A—A of FIG. 2.
Figure 2:
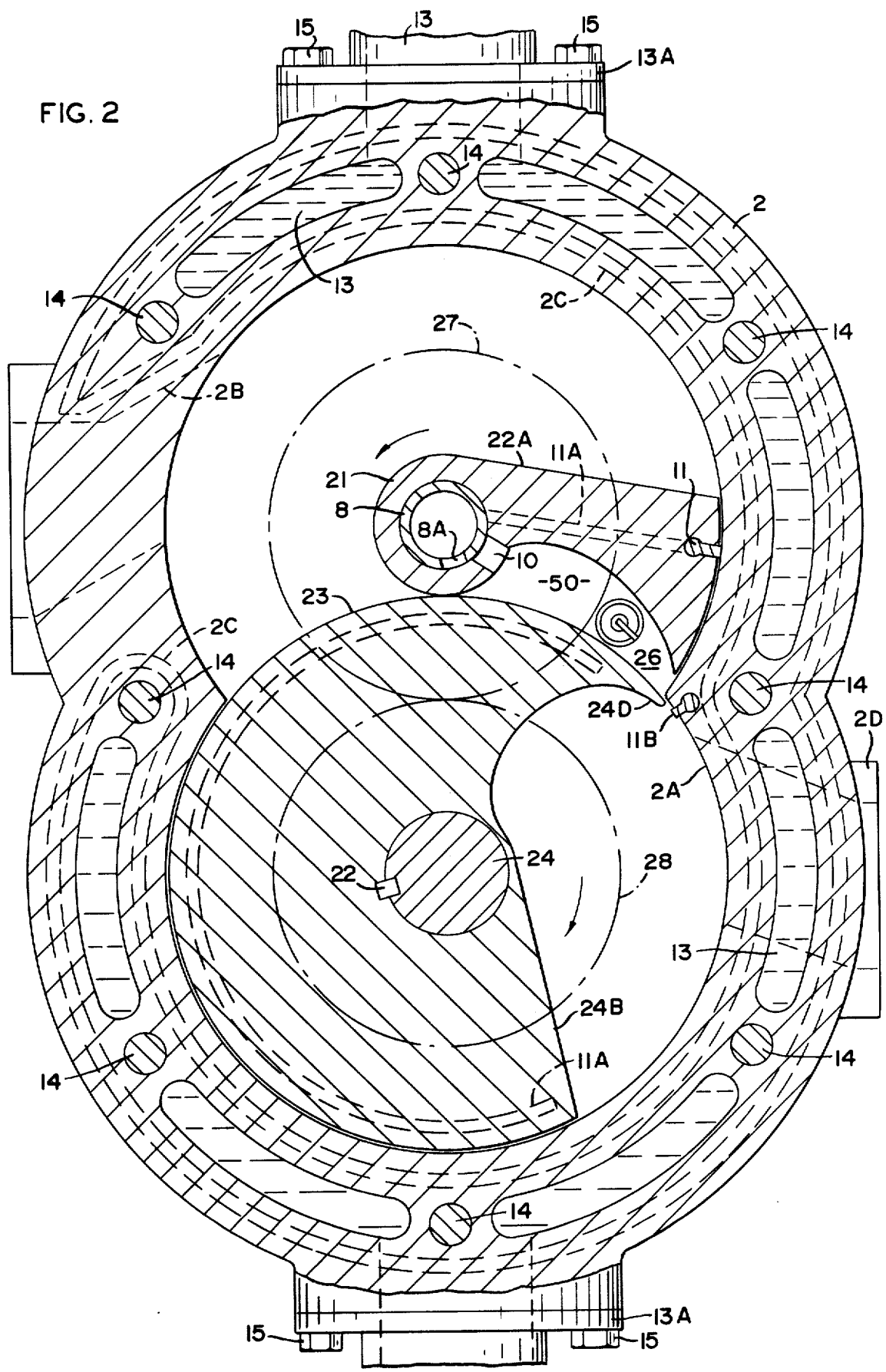
FIG. 2 is a side elevation of the rotary engine or motor having the facing side of the engine housing or casing removed and showing the rotors in the position forming the sealed combustion chamber with the fuel inlet passages closed to prevent feed back of ignited fuel fumes and immediately prior to explosion of the fuel by the spark plug.
Figure 4:
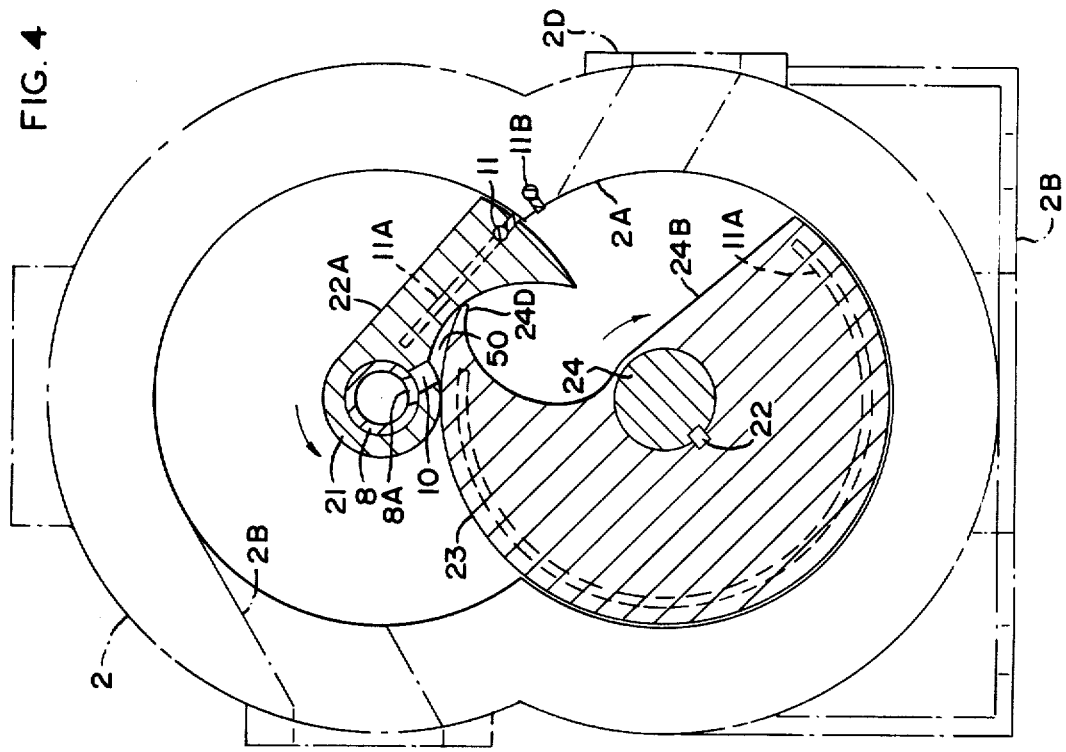
Figure 3:
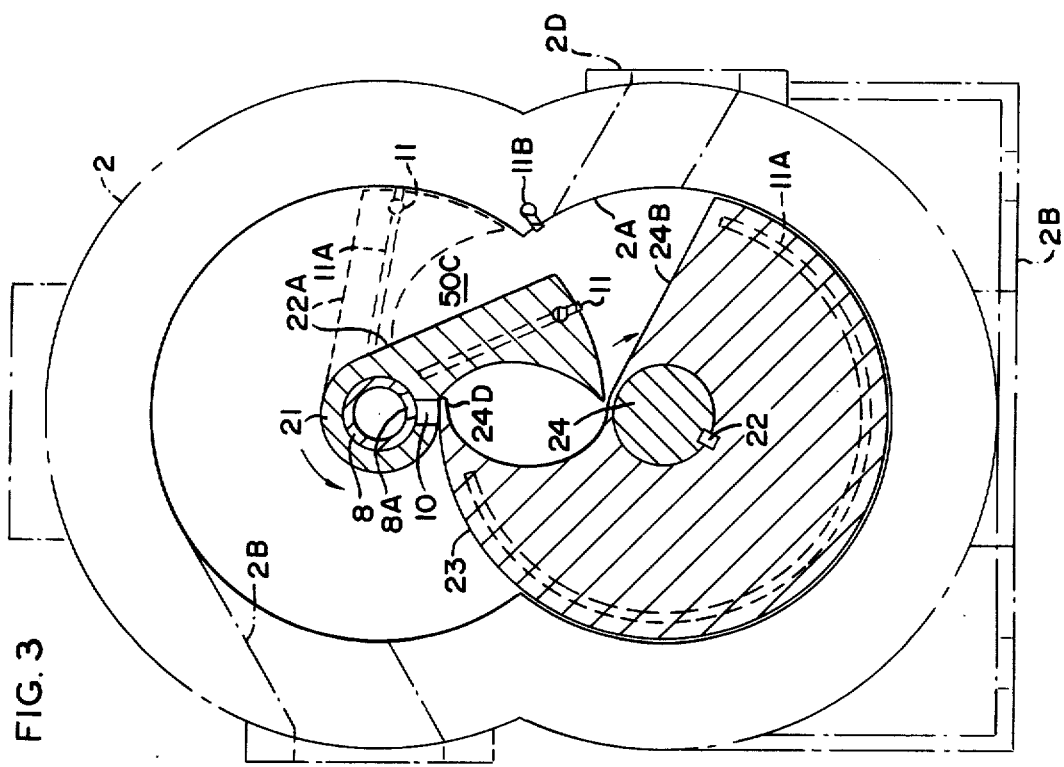
FIG. 3 is a cross sectional view of the internal rotors taken along line C—C of FIG. 1 with the rotors shown in a position just prior to the forming of the combustion chamber.

FIG. 4 is a cross sectional view taken on line C-C of FIG. 1 showing the rotors at the beginning of the formation of the combustion chamber with the fuel inlet partially open to permit the initial passage of compressed fuel into the forming combustion chamber and as the rotors continue to rotate the sealed combustion chamber will be completely formed and the fuel injection openings completely opened while the continued rotation of the rotors will position these respective elements into the positions as shown in FIG. 2.

SEQUENCE OF OPERATION

The following sequence of operation relating to the workings of the present invention, is outlined and explained in conjunction with the accompanying drawings, wherein, 40 of sheet 1 is the electric starter including starter bendix drive spring 42. When the starter is energized by the manual turning of the starter key (not shown), the bendix drive 41 of the starter contacts and rotates the motor fly wheel 25. Fly wheel guard 17 is secured to the housing 1 by securing screws 16. In turn, the rotation of the fly wheel also rotates the top internal rotor 22 that is a part of the fly wheel drive shaft 21, the bottom internal rotor 24B with outside diameter 23 that is a part of shaft 24 is also rotated by the rotatable connection of the spur gears 27-28 mounted on shafts 21-24. Seals 11A are formed on rotors 22 and 24B to form a seal between the sides of the housing 1 and rotors 22 and 24B. Seal 11 is formed on the perimeter of rotor 22 to form a seal between the rotor 22 and interior wall of housing 1 while Seal 11B forms a seal between rotor 24B and the interior wall of housing 1.

A V-belt drive pulley 24C is mounted on the left end of the rotor mounting shaft 24. A V-drive belt 30 connects drive pulley 24C to V-pulley 31, that is mounted on the right end of the compressor shaft 32 to provide for the rotation of the compressor 33. The rotation of the compressors internal impeller (not shown) draws mixed gas from the fuel mixer feed line 35 through the fuel mixer 34 to the compressor 33 through connecting manifold 33C, the gas that enters the compressor through manifold 33C is discharged from the compressor through tube 5, that in turn is connected to the fuel imput manifold 8, having the outer flanged portion 8A rigidly internally secured to the left housing end plate 2, the tubular portion 8 of the fuel imput manifold is inserted into a matching cavity formed inward in the left end center of the rotor shaft 21, an opening 8A in one side of tubular portion of the fuel imput manifold 8 matches up with an opening 10 in the rotor 22, pressurized gas stored in the manifold escapes to the explosion chamber 50 when opening 8A and 10 match up, the continued rotation of the rotors, close fuel imput opening 8A and 10 trapping the gas in the explosion chamber 50. At this time the ignition distributor 18 coupled to electric energy source (not shown) through ignition distributor lead 19 and mounted on housing 1 by securing screws 18A that is connected to and caused to rotate by rotor shaft 24A delivers an ignition spark through ignition distributor output 20 to spark plug 12 mounted horizontally in the right housing end plate 2. The spark plug mounting opening continues inward through the housing end plate 3 to match up with the explosion chamber 50 between the internal rotors 22-24B. The occurring explosion of the gas fumes in the combustion or explosion chamber 50 at this time drives the rotors 22-24B. The check valve 6 prevents the gas from returning from the manifold 8 to the compressor 33. The manifold 8 is mounted to the housing 1 by mounting flange 8B which is secured thereto by mounting screws 8C. The manifold seal ring 8D is disposed between the manifold 8 and housing 1 as best shown in FIG. 1.

In the operation of the motor, one fuel imput cycle and one power explosion and exhaust occurs for each revolution of the rotors.

In the interest of simplicity the liquid cooling system for the rotors 22-24B is not shown.

The internal combustion powered rotary motor of the invention having a figure 8 shape liquid cooled housing 1 with inside diameter 2A vertically encircling and horizontally spanning two horizontally mounted rotors consisting of a bottom rotor 24B and a top rotor 22A in fixed relation one above the other, supported by liquid cooled housing end plates 2 and 3 that are vertically secured to each side of the housing 1 by securing screws 14 to form an enclosure of the shafts 21 and 24 that are a part of the rotors extend outwardly horizontally from the vertical part of the rotors to provide means for the rotatable mounting of the rotors in the housing on each side by means of the rotor shafts 21 and 24 extending through the rotor mounting bearings 4 that are a part of each end plate. The rotor shafts that extend through and beyond the right housing end plates are rotatably connected together by mounting spur gears 27 and 28 on the top and bottom rotor shafts that mesh together in fixed timed relation with each other. Coolant seal 2c is disposed between the housing 1 and the end plates 2 and 3. A liquid coolant flow manifold B is mounted to housing 1 by securing screws 15.

Inasmuch as the c to c (that is the distance between the centers of the two shafts) mounting distance between the top and bottom rotor mounting shafts is less than the outside diameter of the rotors, the rotors are necessarily shaped to nest and run together, the top rotor 22A has a portion extended outward from its outer diameter of the rotor shaft that in turn rotatably seals against the inner diameter bore of the top part of the rotor housing. The bottom rotor 24B is cut away inward from its outer convex diameter towards the outer diameter of the rotor shaft to provide for the rotatable passage of the top rotor extension. The outer diameter of the bottom rotor seals against the outer diameter of the top rotor shaft also the outer diameter of the bottom housing bore.

The top rotor revolves counter-clockwise. The bottom rotor revolves clockwise. An explosion chamber is formed between the bottom side of the top rotor extension and the outer diameter of the cut away portion of the bottom rotor.

Premixed pressurized fuel is piped from the compressor 5 to the explosion chamber through a fuel mixture input tube that is rigidly connected to a fuel input manifold 8 that in turn is rigidly secured to the left housing end plate. A tubular shaped extension 8E of the manifold 8 extends inward into a cavity formed in the center of the left end of top rotor mounting shaft 21 the inner end of the manifold is closed to provide for a build up of pressurized fuel in the manifold. An opening in the center outer diameter of the manifold extension 8E is timed by the rotation of the rotor to match up with a second opening in the top rotor shaft to facilitate passage of the pressurized fuel from the manifold to the explosion chamber that is formed by the rotation of the rotors. The fuel input manifold tube 8E that is inserted into the cavity of the top rotor shaft having the outer end rigidly fixed to the left end housing end plate in timed relation with the top rotor make up a rotary fuel input valve.

In one rotation of the rotors the fuel passages will be opened to allow the passage of fuel from the manifold to the explosion chamber of the rotors and close by the engagement of a portion of the convex surface of the lower rotor with the shaft of the upper rotor this passage before the power explosion takes place. One explosion occurs during each revolution of the rotors to provide the rotors driving force. The explosion chamber is formed between the concave perimetal portion of the lower rotor and the upper rotor and is closed by the engagement of the projection of the upper rotor with a portion of the perimeter of the lower rotor.

The centrifugal compressor 33 is mounted on the outer side of the left housing end plate. The compressor is rotatably driven by means of a V-belt 30 that connects a drive pulley 31 mounted on the outer left end of the bottom rotor shaft 24 that extends through and outward beyond the left end housing end plate to the drive pulley mounted on the right side of the compressor 33. The drive pulley mounted on the bottom rotor shaft is larger than the corresponding pulley of the compressor, therefore the compressor rotates at a higher rate of speed. The fast rotation of the compressor impeller (not shown) produces a vacuum at the center air intake of the compressor. Air and gas entering the compressor via the manifold 8 connecting the compressor to the fuel mixture unit is compressed and expelled into the fuel input manifold.

Inasmuch as rotation of the compressor is required to vacuum and compress the power driving fuel, an electric starter 40 is mounted on the right side of the engine or motor right end plate, when the starter is energized the bendix drive that is a part of the starter automatically engages the engine fly wheel thus rotating all the engine rotatable components, including the distributor. When the engine starts the bendix starter drive automatically disengages the fly wheel 25.

From the foregoing it will be seen that a single compact internal explosion rotary motor has been provided comprising a pair of rotors connected to rotate in synchronism and during their period of rotation to form a combustion chamber between them into which fluid under compression is delivered under control of the rotary movement of the top rotor and upon completion of the formation of the combustion chamber and the infusion of compressed fluid therein, the compressed fluid is ignited providing the power generating movement of the rotors opens an exhaust port to permit exhaust of the burnt fuel from within the housing containing the rotors, so that during operation of the motor a power stroke or movement is provided during each complete rotation of the rotors.

Thus, it will be apparent that in the practice of the invention numerous changes, modifications and the full use of equivalents may be resorted to without departing from the spirit or scope of the invention as outlined in the claims.

What is claimed is:

1. In an internal combustion rotary engine, a housing having an internal chamber formed therein, a first and second shaft mounted on said housing, an upper rotor formed on said first shaft and a lower rotor affixed to said second shaft, said first shaft comprising a substantially cylindrical member and said upper rotor comprising an enlarged portion extending outwardly from said substantially cylindrical member, interconnecting means coupled to each one of said shafts to operatively interconnect said rotors for simultaneous rotation in opposite directions, said upper and lower rotors each including convex perimetal sections for sealing engagement with the interior wall of said chamber, said convex perimetal section of said upper rotor being formed on the outer end of said enlarged portion, portions of the perimetal surfaces of said rotors being shaped to permit nesting thereof during rotation and to form a sealed explosion chamber between portions of the perimetals of said rotors at predetermined intervals of rotation, means for injecting compressed fuel into said explosion chamber, means for igniting fuel in said explosion chamber at a predetermined position of said rotors, said housing having an exhaust passage formed therein to permit exhaust of burned fuel from said housing as said rotors rotate to open said explosion chamber following combustion, said first shaft having an axial bore including a rotor fuel flow opening, said rotor fuel flow opening extending between said axial bore and said outer periphery of said cylinder member adjacent the inner portion of said upper rotor, a hollow fuel inlet tube extending into said axial bore and having at least one manifold fuel flow opening formed radially therethrough and in axial alignment with said rotor fuel flow opening, said manifold fuel flow opening and said rotor fuel flow opening disposed to selectively communicate in axial alignment relative to one another during predetermined position of said rotor during each rotation of said rotors, said convex perimetal of said lower rotor engaging said first shaft adjacent said rotor fuel flow opening to close said rotor fuel flow opening and said manifold fuel flow opening from said explosion chamber upon initial forming of said explosion chamber during each rotation of said rotors when said rotor fuel flow opening and said manifold fuel flow opening are partially aligned, said manifold fuel flow opening being oriented relative to said means for igniting the fuel such that fuel flows from said fuel inlet tube through said manifold fuel flow opening and said rotor fuel flow opening to said explosion chamber after said explosion chamber is initially formed and prior to ignition during each rotation of said rotors when said rotor fuel flow opening and said manifold fuel flow opening are axially aligned, said manifold fuel flow opening being oriented relative to said means for igniting the fuel that such that said manifold fuel opening is closed from said explosion chamber by said first shaft means during combustion during each rotation of each said rotors.

2. In an internal combustine rotary engine as claimed in claim 1, including a fuel manifold having a communication with said inlet tube to deliver fuel thereto and means for delivering fuel under pressure to said manifold.

3. In an internal combustion rotary engine as claimed in claim 1, wherein said rotors each having portions thereof cut away to form concave surfaces radiating inwardly toward said shafts from the outer perimeters to permit nesting of said rotors during rotation and to form projections on the perimeters of said rotors for engagement with each other during the rotation of said rotors to form a closed explosion chamber therebetween at a predetermined interval during each rotation of said rotors.

4. In an internal combustion rotary engine as claimed in claim 2, wherein a fuel mixing chamber, a compressor for receiving fuel from said mixing chamber for compressing and delivering said compressed fuel to said manifold.

5. In an internal combustion rotary engine as claimed in claim 4, including power transmission means connecting said compressor to said first shaft for driving said compressor by rotation of said shaft.

* * * * *